United States Patent

Kikuchi

[11] Patent Number: 6,021,027
[45] Date of Patent: Feb. 1, 2000

[54] DISC CARTRIDGE LINER

[75] Inventor: Shuichi Kikuchi, Miyagi, Japan

[73] Assignee: Sony Corporation, Tokyo, Japan

[21] Appl. No.: 08/267,049

[22] Filed: Jun. 28, 1994

[30] Foreign Application Priority Data

Jun. 29, 1993 [JP] Japan .................................. 5-182140

[51] Int. Cl.[7] .................................................. G11B 23/03
[52] U.S. Cl. ............................................................ 360/133
[58] Field of Search ............................ 360/133; 369/71, 369/72, 77.2, 291, 292, 272; 206/309, 312, 313; 428/900, 284

[56] References Cited

U.S. PATENT DOCUMENTS

| | | | |
|---|---|---|---|
| 4,812,938 | 3/1989 | Rogers et al. | 360/133 |
| 4,998,176 | 3/1991 | Takemae et al. | 360/133 |
| 5,060,105 | 10/1991 | Howey | 360/133 |
| 5,122,919 | 6/1992 | Takemae et al. | 360/133 |
| 5,179,487 | 1/1993 | Niitsuma et al. | 360/133 |
| 5,189,585 | 2/1993 | Kubo | 360/133 |

FOREIGN PATENT DOCUMENTS

| | | |
|---|---|---|
| 0 452 536 | 10/1991 | European Pat. Off. . |
| 0 495 235 | 7/1992 | European Pat. Off. . |
| 0 538 971 | 4/1993 | European Pat. Off. . |
| M1159V52 | 12/1974 | Germany .............................. 360/133 |

*Primary Examiner*—Allen T. Cao
*Attorney, Agent, or Firm*—Hill & Simpson

[57] ABSTRACT

A disc cartridge liner, the liner including a thermoplastic fiber entangling body formed by entangling thermoplastic fibers and a cellulose fiber entangling body formed by entangling a regenerated cellulose fiber and a refined cellulose fiber, the thermoplastic fiber entangling body and the cellulose fiber entangling body being heated and pressed to be attached to each other. The refined cellulose fiber forming the cellulose fiber entangling body is contained therein at a rate of not less than 20% by weight, and the refined cellulose fiber has dry strength of not less than 3 g/d. The cellulose fiber entangling body may contain therein a rubber based binder at a rate of not more than 3% by weight. The liner, formed by heating and pressing the thermoplastic fiber entangling body and the cellulose fiber entangling body to be attached to each other, has high strength, dimensional stability, frictional stability and wipe-off performance, and exhibits stable and satisfactory cleaning effect.

4 Claims, 4 Drawing Sheets

DISC CARTRIDGE LINER

BACKGROUND OF THE INVENTION

This invention relates to a disc cartridge liner for wiping off the dust deposited on a recording disc in a disc cartridge.

The recording disc, such as an optical disc, a magnetic disk or a magneto-optical disc, is composed of a disc-like substrate and a signal recording layer provided on the major surface of the disc substrate. Conventionally, such a recording disc is housed in a disc cartridge 31 in the form of casing, as shown in FIG. 1, to be handled as a disc cartridge for preventing damages to the recording disc due to deposition of dust and contact by fingers and for facilitating its handling.

That is, the disc cartridge is constituted by a recording disc 32 rotatably housed in the cartridge 31.

The recording disc 32 has a central portion 32a thereof as a portion to be chucked, to which a disc hub 34 presenting chucking function is secured with an adhesive ring 33 between them, so that the portion to be chucked is held by a disc recording/reproducing apparatus for recording/reproducing information signals onto/from the recording disc 32. The recording disc 32 also has a signal recording surface 32b for writing/reading out information signals on the peripheral side of the central portion 32a.

The cartridge 31 housing the recording disc 32 therein is composed of a pair of an upper half 35 and a lower half 36. The upper half 35 and the lower half 36 are abutted to contact each other for housing the recording disc 32. In the major surfaces of the upper and lower halves 35, 36, recording/reproduction openings 37 are formed for exposing at least part of the signal recording surface 32b of the recording disc 32 to outside. The lower half 36 is also provided with a chucking opening 38 for exposing the disc hub 34 mounted on the recording disc 32 to outside. Thus, the recording disc 32 is held to the disc hub 34 through the chucking opening 38 by the disc recording/reproducing apparatus, so that information signals are written onto and/or read out from the signal recording surface 32b through the recording/reproduction openings 37. The disc cartridge is provided with a shutter member 39 which closes the recording/reproducing openings 37 when the disc cartridge is not in use, to prevent intrusion of dust into the cartridge 31 for protecting the recording disc. The shutter member 39 is caused to be slidable along one side edge of the lower half 36.

In addition, liners 40 are provided in the disc cartridge, for removing the dust which has intruded in the cartridge 31 and deposited on the signal recording surface 32b of the recording disc 32. The liners 40, formed of an unwoven fabric, are attached to major surfaces on the side of housing the recording disc 32 of the upper and lower halves 35, 36, so as to sandwich the recording disc 32 from the major surfaces thereof in contact with the recording disc 32. Consequently, if the recording disc 32 is rotated, the dust deposited on the signal recording surface 32b of the recording disc 32 is wiped off by the liners 40 and taken in between fibers of the liners. Thus, damages to the signal recording surface 32b caused by a magnetic head contacting the surface with dust deposited thereon can be avoided.

Normally, the liner 40 is composed of a single fiber selected from polypropylene, polyester, nylon and rayon, or blended fibers thereof blended at an appropriate proportion.

Rayon, above all, is a type of regenerated cellulose fiber having a petal-shape cross section as shown in FIG. 2. This petal acts advantageously for raising the dust deposited on the sheet surface, exhibiting excellent dust wipe-off effect.

Meanwhile, though rayon exhibits satisfactory cleaning effect, it is very fragile and tends to be lowered in strength by moisture. In addition, since rayon is high in hygroscopicity, it has its coefficient of friction with the recording disc affected by humidity in the operating environment, and has a high rate of contraction due to moisture absorption.

Thus, if this rayon is singly entangled, the resulting entangling body has insufficient durability, and low dimensional precision when punched out into a liner shape. Therefore, it is difficult to form a dimensionally precise production from rayon. Also, since rayon has its slidability affected by humidity when slid in contact with the recording disc, it is difficult to obtain stable cleaning effect. For these reasons, rayon is blended with thermoplastic fibers, such as polyester, polypropylene and nylon, and is thus improved in dimensional stability, frictional stability and strength, to be used for the liner.

However, if rayon is blended with the thermoplastic fiber to form a liner, a greater coefficient of friction of the thermoplastic fiber causes an intense frictional heat to be generated in its contact with the recording disc. The frictional heat softens and abrades the liner, generating abrasion particles. The resulting abrasion particles are deposited onto the recording disc, inducing errors in recording and reproduction. In addition, since the thermoplastic fiber in general is low in water absorption property and high in electrical resistance, it often causes static electricity to be generated in contact with the recording disc, obstructing rotation of the recording disc.

SUMMARY OF THE INVENTION

In view of the above-described status of the art, it is an object of the present invention to provide a disc cartridge liner which is high in strength, dimensional stability and frictional stability, and which rarely causes frictional heat and static electricity to be generated in contact with a recording disc, for exhibiting satisfactory cleaning effect.

According to the present invention, there is provided a disc cartridge liner including a thermoplastic fiber entangling body formed by entangling a thermoplastic fiber, and a cellulose fiber entangling body formed by entangling a regenerated cellulose fiber and a refined cellulose fiber, the thermoplastic fiber entangling body and the cellulose fiber entangling body being heated and pressed to be attached to each other.

Also, the refined cellulose fiber forming the cellulose fiber entangling body is included therein at a rate of not less than 20% by weight.

In addition, the refined cellulose fiber has dry strength of not less than 3 g/d.

Furthermore, a rubber based binder is contained in the cellulose fiber entangling body at a rate of not more than 3% by weight.

The liner according to the present invention is formed by heating and pressing the thermoplastic fiber entangling body of entangled thermoplastic fiber and the cellulose fiber entangling body of entangled regenerated cellulose fiber and refined cellulose fiber, to be attached to each other. Therefore, the liner is high in strength, dimensional stability and frictional stability, and rarely causes frictional heat and static electricity to be generated when the side of the cellulose fiber entangling body is slid in contact with the recording disc, thus exhibiting satisfactory cleaning effect.

Since the regenerated cellulose fiber forming the cellulose fiber entangling body has a petal-shape cross section, the petal acts advantageously for raising the dust deposited on the recording disc surface, exhibiting high dust wipe-off performance. In addition, since the refined cellulose fiber as the other fiber species forming the cellulose fiber entangling body is high in strength and low in hygroscopicity, it is superior in dimensional stability and frictional stability. Accordingly, the cellulose fiber entangling body formed of such refined cellulose fiber and regenerated cellulose fiber exhibits satisfactory cleaning effect, with the inferior strength and moisture resistance of the regenerated cellulose fiber being compensated by the refined cellulose fiber.

In addition, the cellulose fiber entangling body, attached to the thermoplastic entangling body through heating and pressing, avoids fiber fray and maintains its fabric shape. In this case, the cellulose fiber entangling body avoids exposition of thermoplastic resin to the surface contacting the recording disc as in the case where the thermoplastic resin is directly blended with the cellulose fiber entangling body, and exposition of a rubber based binder to the contacting surface as in the case where the rubber based binder is infiltrated through the cellulose fiber entangling body. Consequently, when the liner is slid in contact with the recording disc, no such inconvenience is generated as friction particles, static electricity and adhesion to the recording disc which are induced by sliding of the thermoplastic resin and the rubber based binder in contact with the recording disc.

DETAILED DESCRIPTION OF PREFERRED EMBODIMENT

A preferred embodiment of the present invention will now be described with reference to the accompanying drawings.

Figure 1:
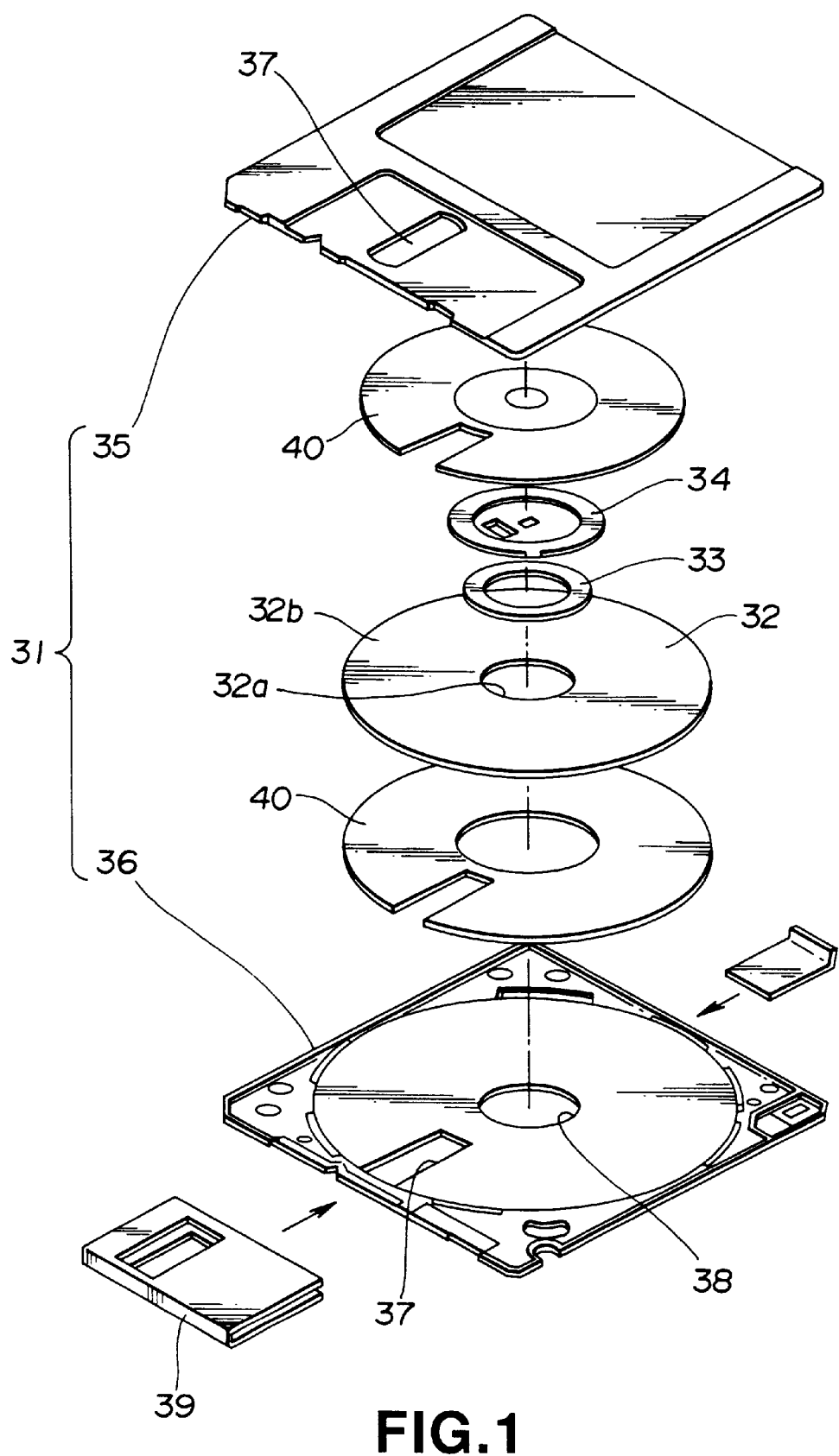
FIG. 1 is an exploded perspective view showing a general structure of a disc cartridge.
Figure 2:
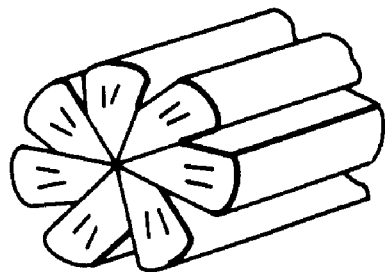
FIG. 2 is a perspective view showing the shape of a regenerated cellulose fiber.
Figure 3:
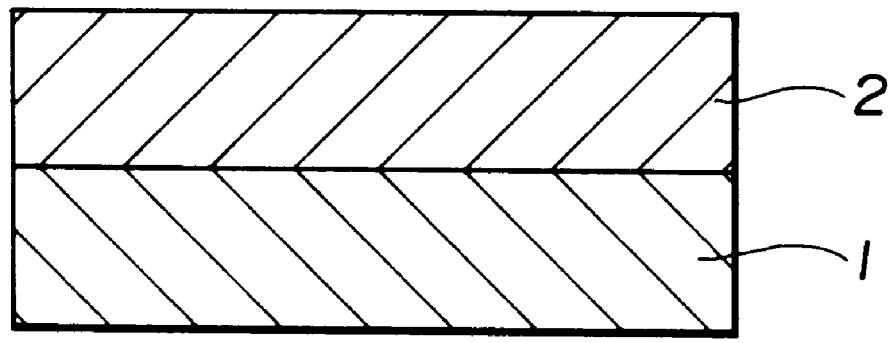
FIG. 3 is a cross-sectional view showing essential portions of a structure of a disc cartridge liner according to the present invention.

A disc cartridge liner is composed of a thermoplastic fiber entangling body 1 formed by entangling a thermoplastic fiber, and a cellulose fiber entangling body 2 formed by entangling a regenerated cellulose fiber and a refined cellulose fiber, with the thermoplastic fiber entangling body 1 and the cellulose fiber entangling body 2 being heated and pressed to be attached to each other, as shown in FIG. 3. The liner is provided in a disc cartridge with the cellulose fiber entangling body 2 contacting a recording disc, thus functioning as a liner.

The regenerated cellulose fiber forming the cellulose fiber entangling body 2 is formed by processing pulp or a cellulose material, such as dissolving pulp, in the following manner.

An alkaline cellulose is formed through alkali treatment of the cellulose material, such as dissolving pulp. The alkaline cellulose is processed with carbon disulfide to form cellulose xanthogenate, which is then dissolved into a sodium hydroxide solution to form viscose. The viscose is solidified fibrously with a sulfuric acid solution and is processed with fiber forming, to form the regenerated cellulose fiber. As the regenerated fibers formed in this manner, rayon, rayon stable and cellophane can be enumerated.

Also, a regenerated cellulose fiber formed by dissolving the cellulose material into a cuprammonium solution and solidifying the resulting product can be used. Cupra is an example thereof.

Since the regenerated cellulose fiber thus formed has a petal-shape cross section, the petal acts advantageously for raising the dust deposited on the sheet surface, exhibiting satisfactory dust wipe-off effect.

The refined cellulose fiber as the other fiber species forming the cellulose fiber entangling body 2 is formed by dissolving the cellulose material directly into an amine oxide based solvent to prepare a fiber forming stock solution and then performing fiber forming from the stock solution. Tencel (trade name, produced by Courtaulds) is an example thereof.

Figure 4:
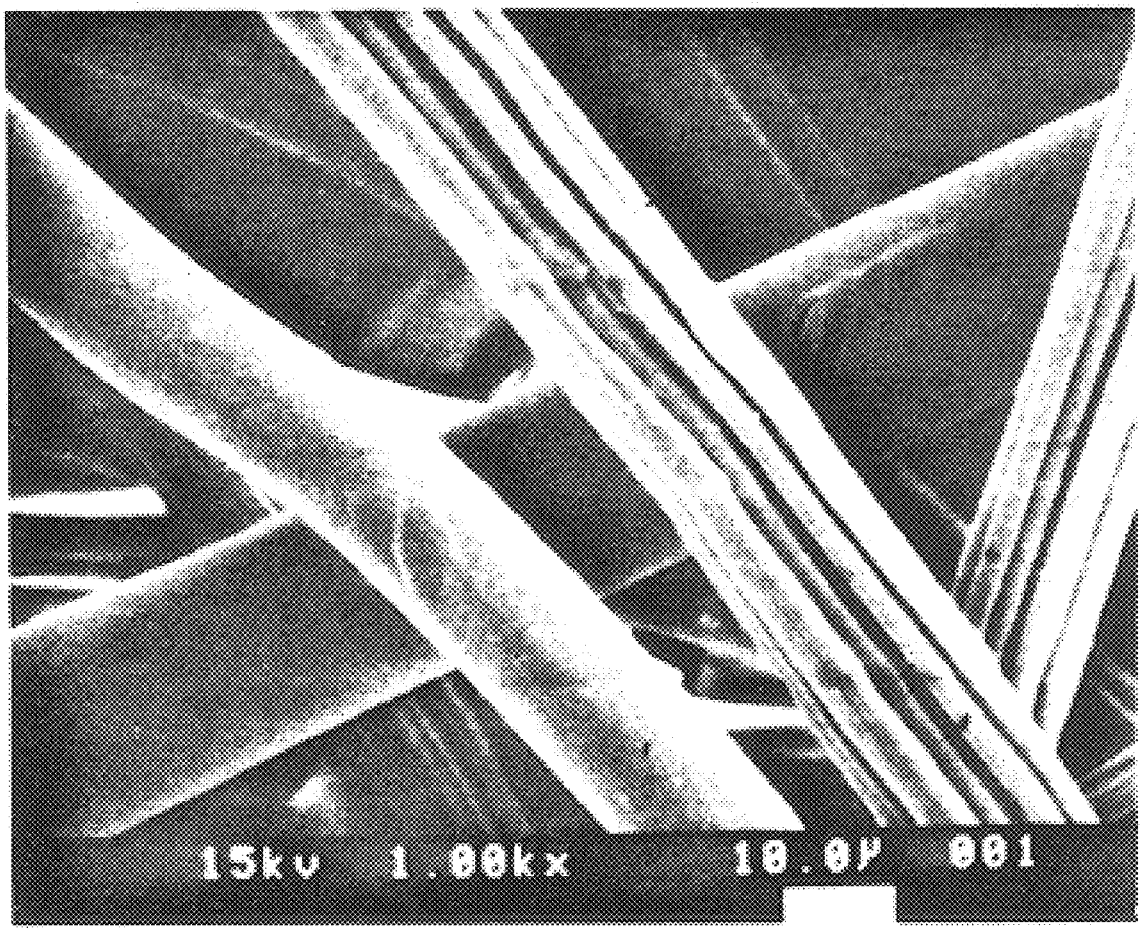
FIG. 4 is a scanning photomicrograph of the disc cartridge liner.

The refined cellulose fiber has a circular cross section, and is therefore inferior to the regenerated cellulose in the dust wipe-off effect. However, since the refined cellulose fiber is higher in strength and lower in hygroscopicity, it has advantages in dimensional stability and frictional stability. Consequently, with the cellulose entangling body 2 formed of such a refined cellulose fiber and the regenerated cellulose fiber, the inferior strength and moisture resistance of the regenerated cellulose can be compensated by the refined cellulose, and sufficient toughness can be obtained while dimensional fluctuations and changes in the coefficient of friction due to changes in humidity can be restricted. Thus, the refined cellulose fiber exhibits stable and satisfactory cleaning effect on the recording disc. As an example of such a fiber entangling body, a fiber entangling body formed of a rayon fiber and a Tencel fiber is shown in a scanning photomicrograph of FIG. 4. In this photograph, the fiber having protruding portions on the surface thereof is rayon, while the fiber having smooth surface is Tencel. With such a fiber entangling body formed of rayon and Tencel, the rayon having the protruding portions provides satisfactory wipe-off performance, while Tencel provides strength and moisture resistance. Thus, the fiber entangling body exhibits desirable cleaning effect.

It is preferred that the proportion of the regenerated cellulose and the refined cellulose of the above-described cellulose fiber entangling body 2 is 8:2 to 2:8, and more preferably 4:6 to 6:4. If the rate of the regenerated cellulose of the cellulose fiber entangling body 2 exceeds 80%, the strength, dimensional stability and frictional stability are lowered while the cleaning effect remains good. On the contrary, if the rate of the refined cellulose exceeds 80%, the cleaning effect is lowered while the strength, dimensional stability and frictional stability can be improved.

It is to be noted that a rubber based binder, such as styrene-butadiene rubber (SBR), may be applied to or infiltrated through the cellulose fiber entangling body 2 in order to prevent fiber fray. However, since an excessively large content of SBR causes high adhesion and hence deterioration in slidability on the recording disc, it is desirable to have the content of the rubber based binder within a range not exceeding 3% by weight.

Meanwhile, the thermoplastic fiber entangling body 1, which is heated and pressed to be attached to the cellulose fiber entangling body 2, is for preventing the fiber fray of the cellulose fiber entangling body and maintaining the fabric shape.

That is, since the cellulose fiber entangling body is not melted through application of heat and therefore cannot be welded by heating to connect the fibers, it is necessary to implement certain treatment for maintaining the fabric shape, such as welding by heating the thermoplastic fiber or adhering the fibers with the use of the rubber based binder.

However, in case where the thermoplastic fiber is directly blended with the regenerated cellulose fiber and the refined cellulose fiber, the thermoplastic fiber along with the cellulose fibers slides in contact with the recording disc in cleaning. Thus, an intense frictional heat is generated, causing abrasion particles, and static electricity is generated, deteriorating the slidability on the recording disc. On the other hand, in case the rubber based binder of a quantity sufficient for perfectly connecting and adhering the fibers is held on the cellulose fiber entangling body, static electricity is generated as in the above case, and the rubber based binder tends to be adhered to the recording disc, causing adverse effects on the recording disc surface. In addition, the rubber based binder fills the space between the petals of the regenerated cellulose, lowering the dust wipe-off performance.

On the contrary, in the liner which is produced by separately forming the cellulose fiber entangling body formed of the entangled regenerated cellulose and refined cellulose and the thermoplastic fiber entangling body of entangled thermoplastic fibers and then heating and pressing the cellulose fiber entangling body and the thermoplastic fiber entangling body to attach them to each other, the fibers of the cellulose fiber entangling body are connected to each other in the following manner.

That is, when the cellulose fiber entangling body is superposed on the thermoplastic fiber entangling body and is heated and pressed, a part of the thermoplastic fiber entangling body is melted and infiltrated through the vicinity of the contacting portion of the cellulose entangling body with the thermoplastic fiber entangling body. Thus, the cellulose fiber entangling body and the thermoplastic fiber entangling body are adhered to each other with the infiltrated thermoplastic fiber and the fiber of the cellulose fiber entangling body are entangled to be welded. At this point, the thermoplastic fiber is held to the cellulose fiber entangling body only in the vicinity of the contacting portion with the thermoplastic fiber entangling body, and the thermoplastic fiber is not exposed onto the surface of the cellulose fiber entangling body opposite to the thermoplastic fiber entangling body, that is, the surface to be slid in contact with the recording disc. Accordingly, in cleaning the recording disc, only the regenerated cellulose fiber and the refined cellulose fiber are slid in contact with the recording disc, effectively removing the dust with the petals of the regenerated cellulose fiber without generating abrasion particles and static electricity.

As the method for entangling the cellulose entangling body and the thermoplastic entangling body, conventional entangling techniques, such as the spun lacing technique and the water jet technique, are employed. However, in order to produce the thermoplastic entangling body, it is preferred to entangle thermoplastic fibers with such techniques and then to slightly weld the entangling body through heat or to adhere the entangling body using the rubber based binder, such as SBR.

Figure 5:
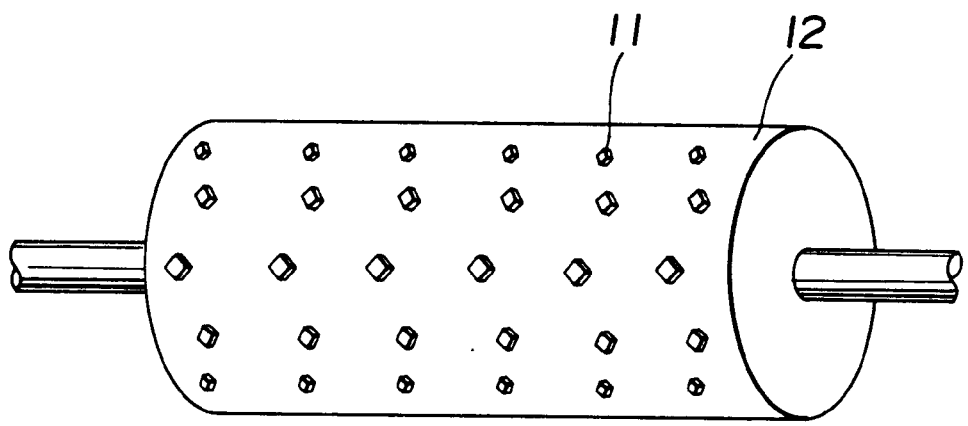
FIG. 5 is a perspective view showing an example of a pressing roll for heating and pressing a cellulose fiber entangling body and a thermoplastic fiber entangling body to attach them each other.
Figure 6:
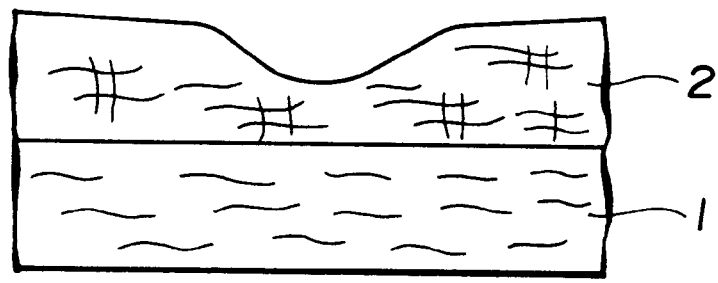
FIG. 6 is a cross-sectional view showing essential portions of the state in which the cellulose fiber entangling body and the thermoplastic fiber entangling body are heated and pressed to be attached to each other.

Also, in heat-welding the cellulose entangling body with the thermoplastic entangling body, if the cellulose fiber entangling body and the thermoplastic fiber entangling body are pressed to be attached to each other using a pressing roll 12 having projections 11 formed on the surface thereof at predetermined pitches, as shown in FIG. 5, the cellulose entangling body and the thermoplastic fiber entangling body are rigidly adhered to each other in part, as shown in FIG. 6, thus exhibiting high durability.

The above-described is the basic structure of the liner.

The liner of the present invention, however, may have a three-layer structure in which the thermoplastic entangling body is sandwiched by the cellulose entangling bodies. With this three-layer structure, since both major surfaces are formed of the cellulose fiber entangling body, it is not necessary to take account of the front and back sides of the liner when attaching the liner to the cartridge. Thus, the manufacturing operation of the disc cartridge can be simplified.

Then, the disc cartridge liner was actually produced with various proportions of the regenerated cellulose fiber and the refined cellulose fiber, and characteristics of the liner were examined. The examination was conducted on five items, that is, the cleaning effect, the generating state of abrasion particles, the water absorption/exhaust contraction, the dry/wet friction torque difference, and strength. The examination method on these items is shown as follows.

Cleaning Effect

After carbon powder is dispersed on one major surface of a magnetic disk, the liner is contacted with the major surface and is pressed by a force of 10 g. The magnetic disk is rotated in this state. After the rotation, the degree of contamination of the liner is checked with a five-point method.

Generating State of Abrasion Particles

The liner is built into the disc cartridge, and the magnetic disk is rotated. The number of dusts having a diameter of not less than 0.5 $\mu$m generated at this point is counted.

Water Absorption/Exhaust Contraction

The liner punched out with a size of 5 cm×5 cm is soaked in 100 ml of water and is rotated therein. After the rotation, drying is carried out twice, and then the dimensional contraction rate (%) is measured.

Dry/Wet Friction Torque Difference

After the liner is built into the disc cartridge, it is stored at the temperature of 50° C., the relative humidity of 95%, and at the temperature of 50° C., the relative humidity of 20%. After the storage, the torque applied on rotation of the magnetic disk is measured, and the torque difference of the magnetic disk rotation after storage is calculated.

Strength

The liner is cut into the width of 1 cm, and the force required for the cutting is measured.

The results of these examinations are shown in the following Table 1.

TABLE 1

| | | | | | |
|---|---|---|---|---|---|
| Ratio of Regenerated Cellulose | 9 | 8 | 5 | 2 | 1 |
| Ratio of Refined Cellulose | 1 | 2 | 5 | 8 | 9 |
| Cleaning Effect | 5 | 4 | 4 | 2 | 2 |
| Generation of Dust (Unit) | 12 | 8 | 3 | 3 | 1 |
| Water Absorption/Exhaust Contraction (%) | 15 | 14 | 11 | 8 | 7 |
| Dry/Wet Friction Torque Difference (g · cm) | 4.0 | 3.5 | 2.2 | 1.5 | 1.5 |
| Strength (kg/cm) | 1.25 | 1.32 | 1.49 | 1.66 | 1.72 |

As shown in Table 1, the characteristics of the disc cartridge liner change, depending upon the ratio of the refined cellulose fiber to the regenerated cellulose fiber. The regenerated cellulose contributes to improvement of the cleaning effect, while the refined cellulose fiber prevents generation of abrasion particles, restricts the water absorption/exhaust contraction and the dry/wet friction torque difference, and improves the strength.

Thus, it will be appreciated that the combination of the regenerated cellulose fiber with the refined cellulose fiber to be used for the liner is effective for controlling the characteristics of the liner. If the regenerated cellulose fiber and the refined cellulose fiber are entangled at a proportion of 2:8 to 8:2, more preferably 4:6 to 6:4, the liner of satisfactory cleaning effect, dimensional stability and frictional coefficient stability can be produced, in which friction particles are rarely generated by sliding in contact with the recording disc.

As is clear from the above description, the disc cartridge liner of the present invention is composed of the thermoplastic fiber entangling body of entangled thermoplastic fibers and the cellulose fiber entangling body of entangled regenerated cellulose fiber and refined cellulose fiber, with the thermoplastic fiber entangling body and the cellulose fiber entangling body being heated and pressed to be attached to each other. Therefore, the liner exhibits high strength, dimensional stability, frictional stability, and wipe-off performance. Thus, dimensionally precise products can be obtainable, and stable and satisfactory cleaning effect can be realized.

What is claimed is:

1. A disc cartridge liner comprising: a thermoplastic fiber entangling body composed of entangled thermoplastic fibers, and a cellulose fiber entangling body composed of entangled regenerated cellulose fibers and refined cellulose fibers, the thermoplastic fiber entangling body and the cellulose fiber entangling body being heated and pressed to be attached to each other.

2. The disc cartridge liner as claimed in claim 1, wherein the refined cellulose fibers of the cellulose fiber entangling body is contained therein at a rate of not less than 20% of the total weight of the cellulose fiber entangling body.

3. The disc cartridge liner as claimed in claim 1, wherein the refined cellulose fiber has dry strength of not less than 3 grams per denier.

4. The disc cartridge liner as claimed in claim 1, wherein the cellulose fiber entangling body contains therein a rubber based binder at a rate of not more than 3% of the total weight of the cellulose fiber entangling body.

* * * * *